(12) United States Patent
Cooks et al.

(10) Patent No.: US 7,910,377 B2
(45) Date of Patent: Mar. 22, 2011

(54) METHODS AND APPARATUSES FOR PREPARING A SURFACE TO HAVE CATALYTIC ACTIVITY

(75) Inventors: Robert G. Cooks, West Lafayette, IN (US); Wen-Ping Peng, West Lafayette, IN (US); Zheng Ouyang, West Lafayette, IN (US); Michael P. Goodwin, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 478 days.

(21) Appl. No.: 12/156,635

(22) Filed: Jun. 3, 2008

(65) Prior Publication Data

US 2009/0011953 A1    Jan. 8, 2009

Related U.S. Application Data

(60) Provisional application No. 60/933,230, filed on Jun. 5, 2007.

(51) Int. Cl.
*H01J 49/30* (2006.01)
*B01L 3/02* (2006.01)

(52) U.S. Cl. .......... 436/173; 436/174; 436/177; 422/50; 422/68.1; 250/281; 250/288; 324/459; 324/464

(58) Field of Classification Search .............. 436/173, 436/174, 177; 250/281, 288; 324/459, 464; 422/50, 68.1
See application file for complete search history.

(56) References Cited

U.S. PATENT DOCUMENTS

| | | | |
|---|---|---|---|
| 6,750,448 B2 * | 6/2004 | Turecek et al. | 250/281 |
| 7,361,311 B2 * | 4/2008 | Cooks et al. | 250/284 |
| 7,381,373 B2 * | 6/2008 | Blake et al. | 250/284 |

* cited by examiner

*Primary Examiner* — Jill Warden
*Assistant Examiner* — M. Cole
(74) *Attorney, Agent, or Firm* — Lawson & Weitzen, LLP; Sonia K. Guterman

(57) ABSTRACT

The invention provides methods and apparatuses that utilize mass spectrometry for preparation of a surface to have catalytic activity through molecular soft-landing of mass selected ions. Mass spectrometry is used to generate combinations of atoms in a particular geometrical arrangement, and ion soft-landing selects this molecular entity or combination of entities and gently deposits the entity or combination intact onto a surface.

11 Claims, 3 Drawing Sheets

METHODS AND APPARATUSES FOR PREPARING A SURFACE TO HAVE CATALYTIC ACTIVITY

RELATED APPLICATION

This application claims the benefit of U.S. provisional application 60/933,230 filed Jun. 5, 2007, and which is hereby incorporated herein in its entirety by reference.

GOVERNMENT SUPPORT

This work was supported in part by a grant number DE-FG02-06ER15807 from the U.S. Department of Energy. The government has certain rights in the invention.

TECHNICAL FIELD

The present invention relates to methods and apparatuses for preparing a surface to have catalytic activity.

BACKGROUND

Most catalytic surfaces involve metal atoms in certain arrangements, sizes and compositions that lead to high reactivity. Previous studies have shown that both the size and composition of catalytic particles play large roles in the catalytic activity of such surfaces.

Numerous methods have been developed for preparation of catalysts. Generally these methods involve precipitation, separation, calcinations and forming. Other methods rely on impregnation of support particles by solutions containing metals. If multiple metals are needed, co-precipitation and the sol-gel processes are often used. Chemical vapor deposition is another method of catalyst preparation, with catalytic species or their precursors being deposited onto the surface, followed by thermal treatments if desired.

Although these methods provide some control over the catalyst surface composition, these methods offer only limited or no control with respect to the catalyst particle size. In many cases, a wide distribution of sizes is seen, unless great care is taken to prepare the surface in a very precise fashion.

There is a need for methods and apparatuses that can precisely and accurately prepare a surface with a compound capable of having catalytic activity as an ion.

SUMMARY

An aspect of the invention provides a method for preparing a surface having catalytic activity, the method including: ionizing a composition containing at least one compound capable of having catalytic activity as an ion and other compositions, to generate ions; separating the ions of the at least one compound by mass/charge ratio from the other ionized components of the composition; and soft-landing the ions of the at least one compound onto the surface, thereby depositing the ions results, preparing the surface having catalytic activity. The term, "at least one compound capable of having catalytic activity as an ion" is here envisioned to include one or a possible plurality of compounds capable of having catalytic activity as ions.

In an embodiment of the method, depositing the ions of the compound at a plurality of addressable locations on the surface. In a related embodiment of the method, the addressable locations are spots.

In an embodiment of the method, the method further includes characterizing the surface having catalytic activity by at least one surface science technology technique. Surface science technology techniques comprise at least one selected from the group of Secondary Ion Mass Spectrometry (SIMS), X-ray photoelectron spectroscopy (XPS), Atomic Force Microscopy (AFM), Optical Interference Measurements (OIM), and scanning electron microscopy (SEM).

In another embodiment of the method, the at least one compound capable of having catalytic activity is at least one selected from the group consisting of molecules, clusters of molecules, and atoms. In another embodiment of the method, ionizing comprises at least one technique selected from the group consisting of electrospray ionization, laser ionization, and thermal ionization (atmospheric pressure thermal desorption ionization).

In another embodiment of the method, the spots at addressable locations are an array of discrete spots. In an alternative embodiment, the method further includes after separating, collecting the ions of the compound capable of having catalytic activity as an ion preparation as a single deposition to recover an amount of the collected ions of the compound. Another embodiment of the method, further comprises removing the collected ions of the compound capable of having catalytic activity as an ion from the surface for further use. An alternative embodiment comprises immobilizing the collected ions of the at least one compound capable of having catalytic activity as an ion to the surface.

In another embodiment of the method, the other compositions in the sample further include additional compounds, in which the additional compounds are capable of having catalytic activity as an ion, the additional compounds having different mass/charge ratios compared to the at least one compound capable of having catalytic activity as an ion. In an alternative embodiment, the composition comprises compounds not capable of having catalytic activity as ions.

Another aspect of the invention provides an apparatus for separating at least one compound capable of having catalytic activity as an ion from other components in a sample and for soft-landing gas phase ions of the compound on a surface, the apparatus comprising: an ionization apparatus for converting the sample into the gas phase ions; a heated capillary distal to the ionization apparatus, in which the heated capillary transfers the ions into a first vacuum region; an ion funnel connecting a distal end of the first vacuum region and a proximal end of a second vacuum region, wherein the ion funnel focuses the ions through an aperture into the second vacuum region, wherein the second vacuum region contains a bent square quadrupole for guiding the ions through a 90° turn; and a skimmer which connects a distal end of the second vacuum region and a proximal end of a third vacuum region, wherein the third vacuum region contains each of a first set of Einzel lenses proximal to a rectilinear ion trap (RIT) mass analyzer for focusing the ions into a beam of ions for entry into the RIT mass analyzer, a second set of Einzel lenses distal to the RIT mass analyzer for controlling velocity and focusing for soft-landing the ions of the compound onto the surface, the surface being distal to the second set of Einzel lenses.

In a related embodiment, the apparatus further comprises a reaction chamber distal to the surface, wherein the surface is moved into the reaction chamber for analysis of reactivity of the at compound capable of having catalytic activity as an ion on the surface. In another embodiment of the apparatus, the ionization apparatus is at least one apparatus selected from the group of: electrospray ionization, laser ionization, and thermal ionization (atmospheric pressure thermal desorption ionization).

In another embodiment of the apparatus, the quadrupole is configured to operate in at least one mode selected from the group consisting of: ion guide and mass filter. In another embodiment of the apparatus, the RIT mass analyzer is configured to operate in at least one mode selected from the group consisting of: ion guide, continuous mass filter, and mass-selective instability.

In certain embodiments of the apparatus, the quadrupole and the RIT mass analyzer are configured to operate in the same mode. In alternative embodiments, the quadrupole and the RIT mass analyzer are configured to operate in different modes.

In another embodiment of the apparatus, the quadrupole is configured to analyze the mass/charge ratio of each ion in the sample. In an alternative embodiment of the apparatus, the quadrupole is configured for preparative separation by mass/charge ratio of the ions of the compound capable of having catalytic activity as an ion from ions of the other components in the sample.

In another embodiment of the apparatus, the RIT mass analyzer is configured to separate by mass/charge ratio the ions of the compound capable of having catalytic activity as an ion from the ions of the other compositions in the sample, or other components of the sample. In an alternative embodiment, the RIT mass analyzer is configured to further analyze the ions of the compound capable of having catalytic activity as an ion, these ions having been separated by the quadrupole from the ions of the other components in the sample.

In another aspect, the invention provides a method for preparing an array of compounds capable of having catalytic activity as ions on a surface, the method comprising: ionizing a sample having at least one compound capable of having catalytic activity as an ion, to generate ions; separating by mass/charge ratio the ions of the compound from ions of other components in the sample; and soft-landing the ions of the compound at a plurality of addressable locations onto the surface to generate the array of compounds capable of having catalytic activity as ions.

In an embodiment of the method for preparing an array, the addressable locations are spots. In another embodiment of the method for preparing an array, the spots comprise different chemical conformations of the compound capable of having catalytic activity as an ion. In an alternative embodiment of the method for preparing an array, the spots comprise a plurality of compounds capable of having catalytic activity as ions.

In another aspect, the invention provides an array for detecting a binding agent that binds to a compound capable of having catalytic activity as an ion, the array comprising a plurality of compounds each capable of having catalytic activity as ions, wherein each compound is immobilized to a discrete addressable location on a substrate surface to form an array of compounds capable of having catalytic activity as ions.

In an embodiment of the array, the compounds capable of having catalytic activity as ions are spotted in duplicate or triplicate or the like on the array. In another embodiment of the array, at least one compound is spotted in different amounts. In another embodiment, the array further comprises at least one compound capable of having catalytic activity as an ion as a positive control. In another embodiment, the array further comprises at least one spot as a negative control. In another embodiment of the array, the plurality of compounds further comprises at least one compound that is not capable of having catalytic activity as an ion.

BRIEF DESCRIPTION OF THE DRAWINGS

FIG. 2 Panel B shows the mass spectrum obtained with the soft-landed material. Comparison of the mass spectrum in FIG. 2 Panel A and the mass spectrum of structure of the soft-landed material in FIG. 2 Panel B shows that the structure of the material used in FIG. 2 Panel A is the same as the structure of the material used in FIG. 2 Panel B.

DETAILED DESCRIPTION

Figure 1:
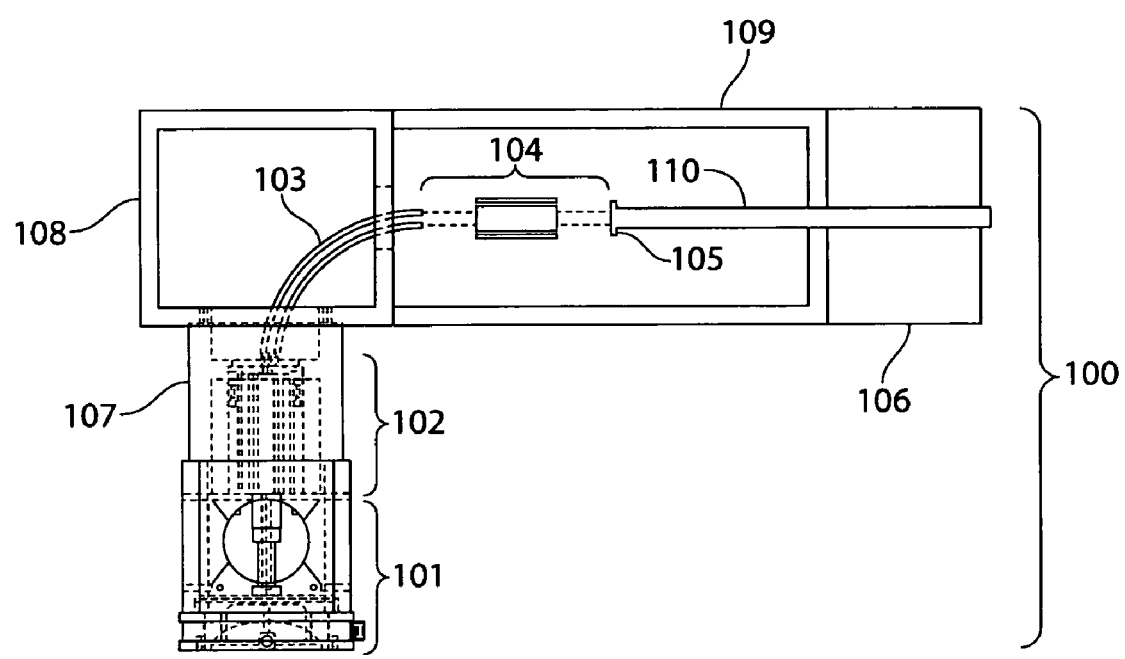
FIG. 1 is a drawing showing an embodiment of apparatus 100 for preparing a surface to have catalytic activity.

The methods and apparatuses provided herein overcome shortcomings of current catalyst preparation methods, by utilizing an ion soft-landing mass spectrometer that can precisely select catalyst particles of known size and composition before depositing them onto a surface. The term, "soft-landing" refers to a process in which an apparatus, for example, a series of lenses, is used to focus ions from a mass spectrometer and control the velocity of these ions so as to gently deposit these ions intact onto a surface. In contrast to the process of impregnation, soft-landing gently deposits intact ions onto a surface, whereas impregnation bombards a surface with ions to embed the ions into the surface.

An aspect of the invention provides a method for preparing a surface having catalytic activity, the method including: ionizing a sample containing at least one compound capable of having catalytic activity as an ion and other compositions, to generate ions; separating by mass/charge ratio the ions of the at least one compound from the ions of the other compositions; and soft-landing the ions of the at least one compound onto the surface, in which depositing the ions results in a prepared surface that has catalytic activity. The term, "at least one compound capable of having catalytic activity as an ion" is here envisioned to include one or a possible plurality of compounds capable of having catalytic activity as ions.

In an embodiment of the method, depositing the ions of the compound capable of having catalytic activity as an ion is producing a plurality of addressable locations on the surface. In a related embodiment of the method, the addressable locations are spots.

In an embodiment of the method, the method further includes characterizing the surface having catalytic activity by at least one surface science technology technique. Surface science techniques include Secondary Ion Mass Spectrometry (SIMS), X-ray photoelectron spectroscopy (XPS), Atomic Force Microscopy (AFM), Optical Interference Measurements (OIM), and scanning electron microscopy (SEM).

In another embodiment of the method, the at least one compound capable of having catalytic activity is at least one selected from the group consisting of molecules, clusters of molecules, and atoms. In another embodiment of the method, ionizing includes at least one technique selected from the group consisting of electrospray ionization, laser ionization, and thermal ionization (atmospheric pressure thermal desorption ionization).

In another embodiment of the method, the spots at addressable locations are an array of discrete spots. In an alternative embodiment, the method further includes after separating, collecting the ions of the at least one compound capable of having catalytic activity as an ion as a single deposition for preparative purposes to recover an amount of the collected ions of the compound. In certain embodiments of the method, the collected ions of the at least one compound capable of having catalytic activity as an ion can be removed from the surface for further use. In alternative embodiments, the collected ions of the at least one compound capable of having catalytic activity as an ion are immobilized to the surface.

In another embodiment of the method, the other compositions in the sample further include additional compounds, in which the additional compounds are capable of having catalytic activity as an ion, and in which the additional compounds have different mass/charge ratios compared to the at least one compound capable of having catalytic activity as an ion that has been soft-landed. In an alternative embodiment, the other compositions in the sample further include a mixture of compounds that are not capable of having catalytic activity as ions Another aspect of the invention provides an apparatus for separating at least one compound capable of having catalytic activity as an ion from other compositions in a sample and soft-landing gas phase ions of the at least one compound capable of having catalytic activity as an ion on a surface, the apparatus including: an ionization apparatus for converting the sample into the gas phase ions; a heated capillary distal to the ionization apparatus, in which the heated capillary transfers the ions into a first vacuum region; an ion funnel connecting a distal end of the first vacuum region and a proximal end of a second vacuum region, in which the ion funnel focuses the ions through an aperture into the second vacuum region, in which the second vacuum region contains a bent square quadrupole for guiding the ions through a 90° turn; and a skimmer which connects a distal end of the second vacuum region and a proximal end of a third vacuum region, in which the third vacuum region contains a first set of Einzel lenses proximal to a rectilinear ion trap (RIT) mass analyzer for focusing the ions into a beam of ions for entry into the RIT mass analyzer, and the third vacuum region further includes a second set of Einzel lenses distal to the RIT mass analyzer for controlling velocity and focusing the ions of the at least one compound capable of having catalytic activity as an ion for soft-landing the ions of the compound capable of having catalytic activity as an ion onto the surface, the surface being distal to the second set of Einzel lenses.

In a related embodiment, the apparatus further includes a reaction chamber distal to the surface, in which the surface can be moved into the reaction chamber for analysis of reactivity of the at least one compound capable of having catalytic activity as an ion on the surface. In another embodiment of the apparatus, the ionization apparatus is at least one apparatus selected from the group of: electrospray ionization, laser ionization, and thermal ionization (atmospheric pressure thermal desorption ionization).

In another embodiment of the apparatus, the quadrupole is configured to operate in at least one mode selected from the group consisting of: ion guide and mass filter. In another embodiment of the apparatus, the RIT mass analyzer is configured to operate in at least one mode selected from the group consisting of: ion guide, continuous mass filter, and mass-selective instability.

In certain embodiments of the apparatus, the quadrupole and the RIT mass analyzer are configured to operate in the same mode. In alternative embodiments, the quadrupole and the RIT mass analyzer are configured to operate in different modes.

In another embodiment of the apparatus, the quadrupole is configured to analyze mass/charge ratio of each of the ions in the sample. In an alternative embodiment of the apparatus, the quadrupole is configured for preparative separation by mass/charge ratio of the ions of the at least one compound capable of having catalytic activity as an ion from the ions of the other compositions in the sample.

In another embodiment of the apparatus, the RIT mass analyzer is configured to separate by mass/charge ratio the ions of the at least one compound capable of having catalytic activity as an ion from the ions of the other compositions in the sample. In an alternative embodiment, the RIT mass analyzer is configured to further analyze the ions of the at least one compound capable of having catalytic activity as an ion that have been separated by the quadrupole from the ions of the other compositions in the sample.

In another aspect, the invention provides a method for preparing an array of compounds capable of having catalytic activity as ions on a surface, the method including: ionizing a sample having at least one compound capable of having catalytic activity as an ion and other compositions to generate ions; separating by mass/charge ratio the ions of the at least one compound capable of having catalytic activity as an ion from the ions of the other compositions in the sample; and soft-landing the ions of the at least one compound capable of having catalytic activity as an ion onto a plurality of addressable locations of the surface to generate the array of compounds capable of having catalytic activity as ions.

In an embodiment of the method for preparing an array, the addressable locations are spots. In another embodiment of the method for preparing an array, the spots are different chemical conformations of the compound capable of having catalytic activity as an ion. In an alternative embodiment of the method for preparing an array, the spots are a plurality of compounds capable of having catalytic activity as ions.

In another aspect, the invention provides an array for detecting a binding agent that binds to a compound capable of having catalytic activity as an ion, the array including a plurality of compounds capable of having catalytic activity as ions, wherein each compound capable of having catalytic activity as an ion is immobilized to a discrete and known spot on a substrate surface to form an array of compounds capable of having catalytic activity as ions. In an embodiment of the array, the compounds capable of having catalytic activity as ions are spotted in duplicate or triplicate or the like on the array. In another embodiment of the array, at least one of the compounds capable of having catalytic activity as an ion is spotted in different amounts. In another embodiment, the array further includes at least one compound capable of having catalytic activity as an ion as a positive control. In another embodiment, the array further includes at least one spot as a negative control. In another embodiment of the array, the plurality of compounds capable of having catalytic activity as ions further includes at least one compound that is not capable of having catalytic activity as an ion.

Catalytic particles are generated and guided to a mass analyzer such that clusters with a mass/charge (m/z) value corresponding to the desired size and composition are selected and gently deposited onto a surface. The nature of the landed surface can then be characterized by surface science technologies such as Secondary Ion Mass Spectrometry (SIMS), X-ray photoelectron spectroscopy (XPS), Atomic Force Microscopy (AFM), Optical Interference Measurements (OIM), and scanning electron microscopy (SEM).

The methods and apparatuses provided herein offer numerous advantageous uses, such as, preparation of catalytic surfaces of defined chemical composition, preparation of arrays of catalytic sites with varying size and composition, and systematic study of a catalytic system to find optimal cluster size and composition.

Mass spectrometry is used herein for preparation of catalytic surfaces through molecular soft-landing of mass selected ions. An advantage of the method is that mass spectrometry allows combinations of atoms in a particular geometrical arrangement to be generated, and ion soft-landing allows this molecular entity or combination of entities to be selected and then gently deposited, intact, onto a surface.

In certain embodiments, electrospray ionization is used to ionize delicate molecular structures or mixtures of structures to be generated and mass selected. Alternative methods for ionization of a compound, generally a compound or at least one compound, each capable of having catalytic activity as an ion include laser ionization and thermal ionization (atmospheric pressure thermal desorption ionization), and the like.

In certain embodiments, a mass spectrometer is employed that uses a bent square quadrupole for ion-neutral separation and an ion trap for mass-selection of ions prior to landing on the surface. The mass analysis allows for well-controlled selection of the particle size and molecular composition of the compound capable of having catalytic activity as an ion. Therefore catalytic surfaces of known composition can be prepared.

In certain embodiments, subsequent to landing, the activity of the prepared surfaces are analyzed in a reaction chamber that is attached to the instrument. This configuration of apparatus and associated methodology allows researchers to quickly prepare model catalysts of well-controlled chemical composition, and additionally allows in-situ analysis of reactivity of the surface.

Another embodiment of the invention provides an array of compounds capable of having catalytic activity as ions, which allows for a user to perform systematic studies of a variety of different chemical compositions, each having a compound capable of catalytic activity as an ion, and associated differences in catalytic activity are observed. Arrays of varying chemical composition are rapidly prepared and analyzed by methods provided herein, allowing researchers to screen potential compounds capable of having catalytic activity as ions, to determine efficacy as catalysts of chemical compositions of interest.

The methods and apparatuses provided herein have the following additional advantages: well-controlled cluster size and composition of catalytic surfaces prepared by these methods; control of the number and nature of metal atoms on the surfaces; control of ligands attached to the metals; and simultaneous deposition of compounds capable of having catalytic activity as ions, or as support materials, and as a substrate.

Referring to FIG. 1, this drawing shows an embodiment of the apparatus 100, which includes each of a first, a second and a third vacuum region (107, 108, and 109) for keeping the apparatus under vacuum from an atmospheric pressure interface (101). A heated capillary (500 µm inner diameter) is used to transfer the ions into the first vacuum region (107), which is evacuated by a mechanical pump.

The capillary feeds directly into an ion funnel (102) that focuses the ions through an aperture into the second vacuum region or stage (108), which is evacuated by a turbo pump to approximately the milli-Torr range. In this region the ions are guided through a 90° right turn by a Thermo Fisher Scientific bent square quadrupole (103; commercially available from Thermo Fisher Scientific, Inc., Waltham, Mass.). In one embodiment, the quadrupole is configured to operate in ion guide (RF only applied to rods) mode. In an alternative embodiment, the quadrupole is configured to operate in mass filter (RF/DC applied to rods) mode.

The bent square quadrupole (103) is connected at the distal end to a skimmer that connects to a proximal end of the third vacuum region (109), which is pumped by a second turbo pump to a pressure of about $10^{-5}$ Torr. A second mechanical pump backs both turbo pumps.

A set of three Einzel lenses focuses the beam for entry into a long (10 cm) rectilinear ion trap (RIT) mass analyzer (104). In one embodiment, the RIT is configured to operate in ion guide (RF-only) mode. In an alternative embodiment, the RIT is configured to operate in continuous mass filter (RF/DC). In yet another alternative embodiment, the RIT is configured to operate in mass-selective instability (ramped RF with supplementary AC) mode.

The longer length of the RIT mass analyzer (104) ensures that ions undergo more cycles than occur conventionally in the continuous RF/DC mode, increasing the obtainable mass resolution. After the RIT mass analyzer, the beam of ions passes through another set of Einzel lenses for control of velocity and focusing before landing gently onto the landing surface (105). The landed surface in certain embodiments is pulled back into a seal-able reaction chamber (106) by a transfer rod (110). Reactant gases of known composition are then flown into the chamber for analysis of reactivity of the surface.

The square quadrupole and the RIT mass analyzer are configured to operate in the same mode in one embodiment, and are configured to operate in different modes in an alternative embodiment. For example, in one embodiment, the square quadrupole is configured to operate in RF-only ion guide mode and the RIT is configured to operate in mass-selective instability mode. This mass spectrometric arrangement informs the operator of the m/z of each ion present in a very short time period. In another embodiment, the square quadrupole is configured to operate in RF-only ion guide mode and the RIT is configured to operate in continuous RF/DC mode, an arrangement that allows for selection of one m/z value that minimizes soft-landing times by continuously depositing ions onto the surface.

Other arrangements include the square quadrupole configured as an RF/DC filter (without need for the RIT mass analyzer) or both the square quadrupole and the RIT mass analyzer configured as RF/DC filters for tandem mass spectrometry (MS/MS) studies.

In other embodiments, SWIFT waveforms are applied to either the square quadrupole or RIT mass analyzer to allow for continuous selection of multiple m/z values.

The preparation of arrays of compounds capable of having catalytic activity as ions involves ionization of a sample having at least one compound capable of having catalytic activity as an ion and other compositions. The sample in this embodiment is ionized by, for example, electrospray ionization, laser ionization, thermal ionization (atmospheric pressure thermal desorption ionization), or other well-known ionization methods. The ions in the ionized sample are then separated by their mass/charge ratio.

The resulting separated ions, having ions of at least one compound capable of having catalytic activity as an ion, are then immobilized on a surface or substrate at a discrete and addressable spot in accordance with their mass/charge ratio. To achieve this, the surface is moved or scanned in the x-y directions, and stopped at each spot location for a predetermined time to permit the deposit of a sufficient number of ions of the at least one compound capable of having catalytic activity as an ion to form a spot having a predetermined density.

Alternatively, the gas phase ions of the at least one compound capable of having catalytic activity as an ion are directed electronically or magnetically to each of a plurality of different spots on a stationary substrate. The ions of the at least one compound capable of having catalytic activity as an ion are deposited on the surface with methods herein resulting in preservation of their structure, i.e., the ions are soft-landed.

The invention having now been fully described, it is further illustrated by the following examples and claims, which are illustrative and are not meant to be further limiting. Those skilled in the art will recognize or be able to ascertain using no more than routine experimentation, numerous equivalents to the specific procedures described herein. Such equivalents are within the scope of the present invention and claims. The contents of all references, including issued patents and published patent applications cited throughout this application, are hereby incorporated by reference.

EXAMPLES

Example 1

System Configuration

A tube lens and skimmer was used first without an ion funnel, in order to focus the ions that are leaving the inlet capillary into the second vacuum stage. With an electrospray of the peptide MRFA (met-arg-phe-ala; Sigma Aldritch, St. Louis, Mo.), ~200 nA of current was generated outside of the instrument. The current was observed to be ~1 nA after the first skimmer and ~110 pA immediately after the 90° turn at the second skimmer. With the RIT mass analyzer operating in an ion guide RF-only mode ~100 pA was measured after the trap.

With implementation of the ion funnel the current was observed to be increased to ~500 pA. Data obtained in other examples have found an order of magnitude increase in ion current due to decreased ion losses at the apertures when the ion trap was run at ~1-10 mTorr with two stage pumping.

Example 2

Preparation of Surface with Jacobsen's Catalyst

Jacobsen's catalyst (commercially available from Sigma-Aldrich Co.) was ionized by electrospray ionization so that predominantly the molecular ion $(M-Cl)^+$ was generated. This ion was soft-landed using the methods and apparatuses herein on a copper surface at a nominal eV kinetic energy at a current of 250 pA for 1 hour.

The resulting surface was washed with 50 µL of acetonitrile/methanol and the mass spectrum of the wash was recorded using a Thermo Fisher LTQ mass spectrometer (commercially available from Thermo Fisher Scientific, Inc., Waltham, Mass.). The observed mass spectrum of the collected material and the structure of the catalyst are shown in FIG. 2 Panels A and B.

Figure 2A:
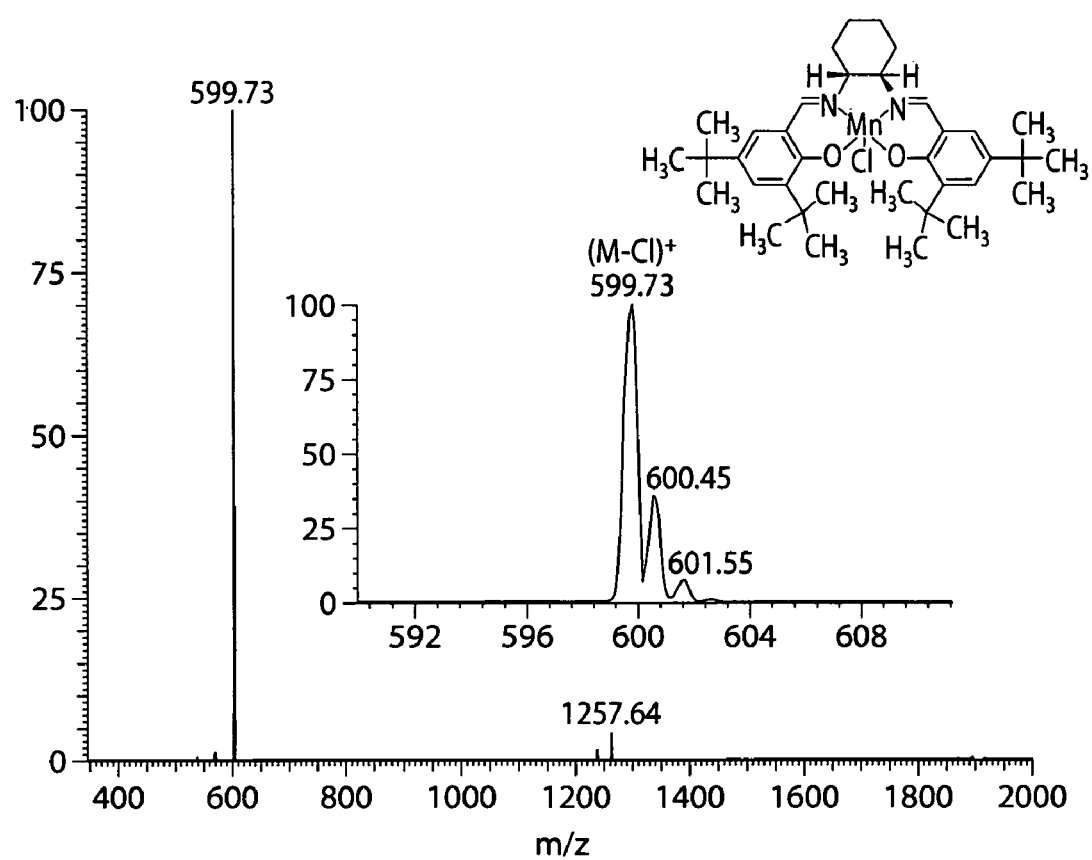
FIG. 2 Panel A shows the mass spectrum obtained with pure Jacobsen's catalyst; the inset shows the structure of the catalyst.
Figure 2B:
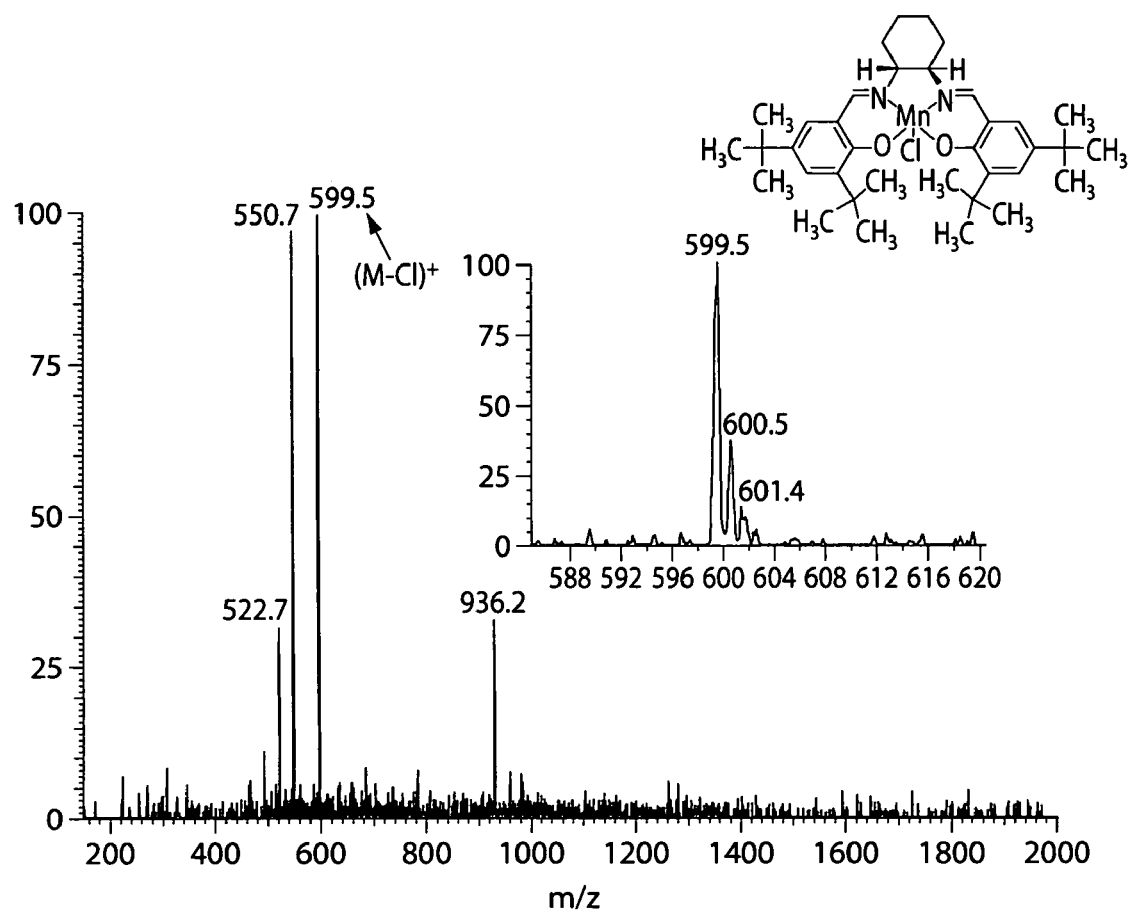

FIG. 2 Panel A shows the mass spectrum observed for pure Jacobsen's catalyst. FIG. 2 Panel B shows the observed mass spectrum of the soft-landed material. The spectral peak in FIG. 2 Panel A was observed at a m/z of 599.5, that in FIG. 2 Panel B was observed at an m/z of 599.73. These data show that the soft-landed material displayed the same mass spectrum as the commercially available starting material. We concluded that the structure in FIG. 2 Panel A was the same as the structure in FIG. 2 Panel B, and thus that the soft-landed material was Jacobsen's catalyst. Therefore Jacobsen's catalyst was successfully soft-landed and collected using the method and apparatus provided herein.

What is claimed is:

1. An apparatus for separating at least one compound capable of having catalytic activity as an ion from other components in a sample and for soft-landing gas phase ions of the compound on a surface, the apparatus comprising:
    an ionizer apparatus for converting the sample into the gas phase ions;
    a heated capillary distal to the ionizer, wherein the heated capillary transfers the ions into a first vacuum region;
    an ion funnel connecting a distal end of the first vacuum region and a proximal end of a second vacuum region, wherein the ion funnel focuses the ions through an aperture into the second vacuum region, wherein the second vacuum region contains a bent square quadrupole for guiding the ions through a 90° turn; and
    a skimmer which connects a distal end of the second vacuum region and a proximal end of a third vacuum region, wherein the third vacuum region contains each of a first set of Einzel lenses proximal to a rectilinear ion trap (RIT) mass analyzer for focusing the ions into a beam of ions for entry into the RIT mass analyzer, and a second set of Einzel lenses distal to the RIT mass analyzer for controlling velocity and focusing for soft-landing the ions of the compound onto the surface, the surface being distal to the second set of Einzel lenses.

2. The apparatus according to claim 1, further comprising a reaction chamber distal to the surface, wherein the surface is moved into the reaction chamber for analysis of reactivity of the compound.

3. The apparatus according to claim 1, wherein the ionization apparatus is at least one selected from the group of: electrospray ionization, laser ionization, and thermal ionization (atmospheric pressure thermal desorption ionization).

4. The apparatus according to claim 1, wherein the quadrupole is configured to operate in at least one mode selected from the group consisting of ion guide and mass filter.

5. The apparatus according to claim 1, wherein the RIT mass analyzer is configured to operate in at least one mode selected from the group consisting of ion guide, continuous mass filter, and mass-selective instability.

6. The apparatus according to claim 1, wherein the quadrupole and the RIT mass analyzer are configured to operate in the same mode.

7. The apparatus according to claim 1, wherein the quadrupole and the RIT mass analyzer are configured to operate in different modes.

8. The apparatus according to claim 1, wherein the quadrupole is configured to analyze mass/charge ratio of each ion in the sample.

9. The apparatus according to claim 1, wherein the quadrupole is configured for preparative separation by mass/charge ratio of the ions of the compound capable of having catalytic activity as an ion from ions of the other components in the sample.

10. The apparatus according to claim 1, wherein the RIT mass analyzer is configured to separate by mass/charge ratio the ions of the compound capable of having catalytic activity as an ion from ions of the other components in the sample.

11. The apparatus according to claim 1, wherein the RIT mass analyzer is configured to analyze the ions of the compound capable of having catalytic activity as an ion that have been separated by the quadrupole from ions of the other components in the sample.

* * * * *